United States Patent [19]

Knaggs

[11] 4,449,722
[45] May 22, 1984

[54] DRIVER FOR ALLEN HEAD SCREWS

[76] Inventor: Roy E. Knaggs, 10520 Whiteford Rd., Ottawa Lake, Mich. 49267

[21] Appl. No.: 387,813

[22] Filed: Jun. 14, 1982

Related U.S. Application Data

[63] Continuation-in-part of Ser. No. 184,108, Sep. 4, 1980, abandoned.

[51] Int. Cl.³ .............................................. B23B 5/22
[52] U.S. Cl. ...................................... 279/62; 81/436; 81/438
[58] Field of Search ..................... 279/62; 81/436, 438; 145/61 L

[56] References Cited

U.S. PATENT DOCUMENTS

| 151,298 | 5/1874 | Lewis | 279/62 |
|---|---|---|---|
| 210,875 | 12/1878 | Pierce | 279/62 |
| 1,035,495 | 8/1912 | Szeitl | 279/62 |
| 1,495,233 | 5/1924 | McConnell | 279/62 |
| 1,532,328 | 4/1925 | McConnell | 279/62 |
| 2,315,524 | 4/1943 | Hubbell | 279/62 |
| 2,329,398 | 9/1943 | Duffy | 145/61 L |
| 2,541,196 | 2/1951 | Brague | 81/438 |
| 2,726,091 | 12/1955 | Topar | 81/436 |
| 2,923,335 | 2/1960 | Joyce | 145/61 L |
| 3,680,877 | 8/1972 | Happe | 279/62 |

FOREIGN PATENT DOCUMENTS 142807 12/1930 Switzerland ........................ 279/62

Primary Examiner—Frederick R. Schmidt
Assistant Examiner—J. T. Zatarga
Attorney, Agent, or Firm—Fraser, Barker, Purdue & Clemens

[57] ABSTRACT

A maually operated tool or driver for Allen head screws in which clamping jaws are reciprocated to and from a clamping position by turning of a knurled sleeve. The jaw clamps against a hexagonal operating rod, which can be slid into position through a passageway extending from end to end and through the tool body. This enables the rod to be applied to the tool from either end and militates against the necessity of a predetermined length for the rod. The operating rod fits the socket of the Allen head screw for tightening or loosening it. Flats on the working end of the clamping jaws flatwise engage the side of the rod for insuring against relative turning movement between the rod and the jaws.

1 Claim, 3 Drawing Figures

DRIVER FOR ALLEN HEAD SCREWS

CROSS-REFERENCE TO RELATED APPLICATION

This is a continuation-in-part of application Ser. No. 184,108, filed Sept. 4, 1980, now abandoned.

BACKGROUND OF THE INVENTION

Allen head screws are widely used by factories, for example, to hold carbide tooling for machining processes where rigidity and reliability of securement are of great importance. These Allen head screws usually have an enlarged circular head formed with a socket therein, the side walls of which are typically hexagonal in cross section to receive an operating rod in the form of a rod which is hexagonal in cross section to snugly fit within the screw socket. The upper end of the operating rod is typically bent at an angle to provide an operating handle. These operating rods or wrenches are unsatisfactory because upon the application of the required torque to tighten, alternatively, loosen the associated screws, may, not infrequently, become bent and break and thereby are rendered useless. This is costly because greater time is required to change the tooling. There is thus a desideratum to provide a tool or driver for an Allen head screw which is not only reliable and efficient, but inexpensive and simple to operate in a variety of locations.

Reference is made to the following U.S. patents which are pertinent only to the chuck construction and not to the spirit or form of the invention: U.S. Pat. No. 709,014 of Sept. 16, 1902 to Jacobs; and U.S. Pat. No. 1,123,541 of Jan. 5, 1915 to Jacobs.

SUMMARY OF THE INVENTION

According to this invention, there is provided a small manually operated tool for tightening or loosening Allen head screw fasteners, which can be easily, and reliably operated, time after time, without liability of damage or breakage and which can be introduced into tight places without difficulty for this purpose. The body of the tool is knurled to permit an operator to firmly grip the tool manually. The upper end of the tool is provided with a polygonal cross-sectional configuration so that a suitably sized wrench may be employed to apply torque to the tool. Not only can greater torque and leverage be generated, but this can be achieved satisfactorily without any undue exertion. The hexagonal operator rod which fits the screw can be instantly advanced or retracted with respect to the working end of the tool as occasion requires, so that screws disposed in places where access is difficult, can be readily and effectively reached with the selective use of operating rods or different lengths.

BRIEF DESCRIPTION OF THE DRAWINGS

The concepts and features of the invention will become readily apparent to one skilled in the art from reading the following detailed description of a preferred embodiment of the invention, when considered in light of the following drawing in which.

DETAILED DESCRIPTION OF THE PREFERRED EMBODIMENT

Figure 1:
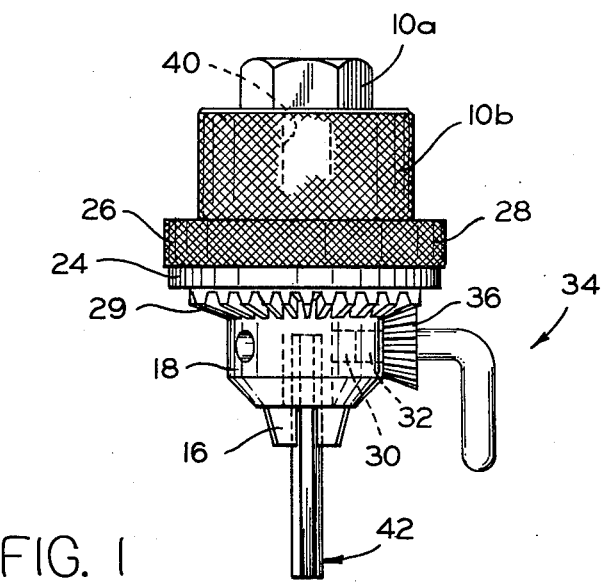
FIG. 1 is a side elevational view of a hand operated tool or driver constructed in accordance with the invention for Allen head screws, together with a hexagonal rod to fit the screws.

The illustrated embodiment of the invention comprises a manually operated driver or tool for Allen head screws which has a metallic body 10, cylindrical in shape, and provided with an external annular groove 12 disposed intermediate its ends. The section of the body 10 above the annular groove 12 includes a polygonal cross-sectional portion 10a, preferably hexagonal in shape to allow a wrench or the like to be employed to apply torque to the body 10 of the driver. Also, the surface of the body may be knurled as at 10b to permit the operator to firmly grip and manually rotate the body by hand. In this structural arrangement, torque is applied directly to the body 10 instead of through an operating sleeve as has been the practice in the past. Formed in the body 10 are three equi-distantly spaced channels 14 (FIG. 2) which are inclined obliquely with respect to the axis of the body 10 and converge towards each other at the outer ends. Jaws 16 are slidable in the channels 14 and gripingly engage an associated Allen screw operating rod when urged outwardly, as will become hereinafter apparent.

The lower end portion 18 of the body 10 is reduced in diameter and is formed with an apertured terminus through which the outer end portions of the jaws 16 advance and retract. For imparting movement to the jaws 16, screw threads 22 are formed on the outer sides of the jaws 16 for meshing engagement with the internal threads of a nut member 24 disposed in the external body groove 12.

An operating ring 26 has an outer peripheral knurled surface treatment 28 to assist in the operation of the tool, as will become readily apparent hereinafter. The operating ring 26 is suitably affixed to the nut member 24, such as by a press fit for turning it in one direction or the other, thereby to advance the jaws 16 to a clamping position or to retract them inwardly away from an associated operating rod for releasing the same.

The width of the ring 26 is such that it just overlaps the adjacent upper portion of the body 10 to secure the nut 24 in the groove 12 and provide a hand grip for adjusting the jaws 16.

The lower portion of the nut 24 terminates in an annular array of beveled gear teeth 29. A series of radially extending holes or sockets 30 is formed in the lower end 18 of the body 10. The sockets 30 receive the end 32 of a key 34 having a set of gear teeth 36 and an operating handle 38. Thus, when the key 34 is in operative position, as illustrated in FIG. 1, the gear teeth 36 operatively engage the teeth 29 of the nut 24. When the key 34 is turned, the meshing teeth 36 and 29 impart rotary movement to the nut 24 relative to the body 10 to effect advancement or retraction of the associated jaws 16. It will be appreciated that, in certain instances, the nut 24 may be manually rotated by the ring 26 relative to the body 10 to effect the desired movement of the jaws 16.

Another feature of the invention resides in providing an axial aperture or passageway 40 extending from end to end of the body 10. This enables an operating rod 42 to be inserted into the tool from either axial end thereof. This becomes important where space requirements are such that the rod 42 cannot be inserted at the front end of the tool. Then, too, if the rod 42 is somewhat lengthy, it is possible to insert it from the rear, as well as adjust the length of the projecting part of the rod 42 for the most efficient working. As is well known, the Allen screw head has a socket therein which is shaped to receive the end of a driver or operating rod which typically is hexagonal in cross section. Thus, the rod 42 may be of any desired length and need not be confined to the length necessary for the particular job, inasmuch as any excess length may extend upwardly into the open ended aperture 40.

Figure 2:
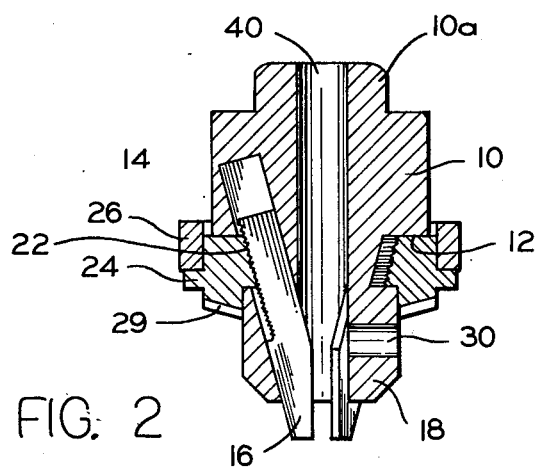
FIG. 2 is a vertical sectional elevational view of the tool shown in FIG. 1.
Figure 3:
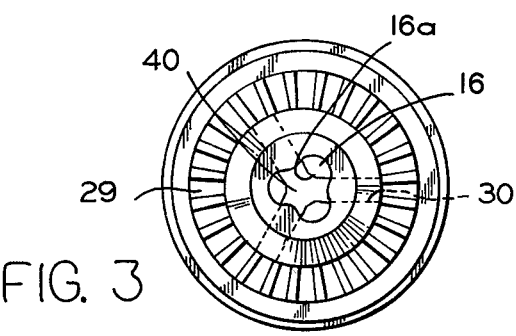
FIG. 3 is a bottom end view of the tool.

It will be observed in the preferred embodiment of the invention as illustrated in FIGS. 1, 2, and 3, at least the inner portion of the terminal ends of the jaws 16 are provided with flat surfaces 16*a* which enable firm, positive, engagement with the outer peripheral configuration of the associated operator rod 42.

It will be appreciated from the foregoing description that a novel driving tool has been produced wherein torque is applied directly to the body of the tool and not through the sleeve advancing and retracting the clamping jaws of the device. Accordingly, there is no possibility of the jaws loosening during use.

The simplicity of the tool enables the actuation of Allen head screws to be more easily and speedily accomplished. The strength of the tool is great since a high torque can be readily imposed and the liability of bending or breakage, such as frequently experienced with ordinary "L" or "T"-shaped drivers, are obviated.

Further, it will be readily apparent that the tool is capable of satisfactorily holding and containing any size Allen head rod stock which is smaller in diameter than the maximum opening of the cooperating jaws 16.

Changes in details of construction, choice of materials, and design may be affected without departing from the spirit of the invention.

I claim:

1. A tool for Allen head screws, comprising:
   (a) an elongate operating rod having a polygonal cross-section;
   (b) a body having an external annular groove, the body section above said groove having a cylindrical portion and a polygonal cross-sectional portion adjacent its upper terminal end, the outer surface of said cylindrical portion being provided with a high coefficient of friction surface, an axial passageway extending through said body, said passageway being of uniform size throughout its entire length and adapted to receive said operating rod from either axial end of said passageway, and a plurality of channels converging on and opening into said passageway adjacent the lower terminal end thereof;
   (c) clamping jaws slidably mounted in the channels of said body and having screw threads on the outer sides, said clamping jaws including flat surfaces on the inner clamping side of said clamping jaws for close abutting contact with said operating rod;
   (d) a nut rotatably mounted in said groove and having a threaded connection with said jaws for shifting the same to a clamping or retracting position relative to said operating rod; and
   (e) an operating ring surrounding said nut and internally secured thereto for actuating the same and having the outer surface of said ring provided with a high coefficient of friction surface whereby an operator may quickly position and clamp said body along the length of said operating rod, rotate said operating rod closely adjacent an associated Allen head screw and apply torque directly to said body obviating the loosening of the jaws clamping the operating rod to the body.

* * * * *